(12) United States Patent
Poornachandran et al.

(10) Patent No.: US 9,798,335 B2
(45) Date of Patent: Oct. 24, 2017

(54) ADAPTIVE THERMAL THROTTLING WITH USER CONFIGURATION CAPABILITY

(75) Inventors: Rajesh Poornachandran, Portland, OR (US); Selim Aissi, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 683 days.

(21) Appl. No.: 13/997,312

(22) PCT Filed: Dec. 29, 2011

(86) PCT No.: PCT/US2011/067949
§ 371 (c)(1),
(2), (4) Date: Mar. 20, 2014

(87) PCT Pub. No.: WO2013/101116
PCT Pub. Date: Jul. 4, 2013

(65) Prior Publication Data
US 2014/0222242 A1    Aug. 7, 2014

(51) Int. Cl.
G05D 16/00    (2006.01)
G05D 23/19    (2006.01)
G06F 11/30    (2006.01)
G06F 1/20    (2006.01)

(52) U.S. Cl.
CPC ......... *G05D 23/1917* (2013.01); *G06F 1/206* (2013.01); *G06F 11/3058* (2013.01); *G06F 11/3072* (2013.01)

(58) Field of Classification Search
None
See application file for complete search history.

(56) References Cited

U.S. PATENT DOCUMENTS

| | | | | |
|---|---|---|---|---|
| 5,451,892 A | * | 9/1995 | Bailey | G06F 1/206 327/113 |
| 5,713,030 A | * | 1/1998 | Evoy | G06F 1/206 340/584 |
| 5,752,011 A | * | 5/1998 | Thomas | G06F 1/206 713/501 |

(Continued)

FOREIGN PATENT DOCUMENTS

| | | |
|---|---|---|
| CN | 101639723 A | 2/2010 |
| CN | 101184385 | 9/2010 |

(Continued)

OTHER PUBLICATIONS

China Office Action from related case CN201180076036.2 mailed Feb. 29, 2016.

(Continued)

*Primary Examiner* — Adam Lee
(74) *Attorney, Agent, or Firm* — Grossman, Tucker, Perreault & Pfleger, PLLC

(57) ABSTRACT

An apparatus for adaptive thermal management of a device with user configuration capability, including a secure memory configured to store a thermal management policy; thermal monitoring circuitry configured to monitor thermal states associated with one or more sensor sub-systems of the device; and policy enforcement circuitry configured to implement the stored thermal management policy in response to the monitored thermal state violating a thermal threshold.

35 Claims, 6 Drawing Sheets

(56) References Cited

U.S. PATENT DOCUMENTS

| | | | |
|---|---|---|---|
| 5,940,786 A * | 8/1999 | Steeby | G06F 1/206 327/378 |
| 6,185,642 B1 * | 2/2001 | Beukema | G06F 13/4081 710/302 |
| 6,205,547 B1 * | 3/2001 | Davis | G06F 1/24 713/1 |
| 6,321,175 B1 * | 11/2001 | Nagaraj | G01K 7/42 257/467 |
| 6,442,700 B1 | 8/2002 | Cooper | |
| 6,457,082 B1 * | 9/2002 | Zhang | G06F 1/3203 710/260 |
| 6,470,289 B1 * | 10/2002 | Peters | G01K 7/42 374/10 |
| 6,892,312 B1 * | 5/2005 | Johnson | G06F 1/206 713/320 |
| 6,938,176 B1 * | 8/2005 | Alben | G06F 1/10 713/300 |
| 6,990,208 B1 * | 1/2006 | Lau | G06F 8/65 381/86 |
| 7,036,030 B1 * | 4/2006 | Altmejd | G06F 1/3228 713/322 |
| 7,167,993 B1 * | 1/2007 | Thomas | G06F 1/203 713/322 |
| 7,389,403 B1 * | 6/2008 | Alpert | G06F 9/3851 712/10 |
| 7,447,919 B2 * | 11/2008 | Liepe | H03K 19/0008 713/300 |
| 7,882,369 B1 * | 2/2011 | Kelleher | G06F 1/3203 345/419 |
| 2001/0021217 A1 * | 9/2001 | Gunther | G01K 7/015 374/178 |
| 2002/0087904 A1 * | 7/2002 | Cai | G06F 1/206 713/322 |
| 2002/0104030 A1 * | 8/2002 | Ahn | G06F 1/206 713/310 |
| 2003/0110423 A1 * | 6/2003 | Helms | G06F 1/206 714/100 |
| 2003/0201741 A1 * | 10/2003 | Lee | G06F 1/206 318/268 |
| 2005/0049729 A1 * | 3/2005 | Culbert | G06F 1/206 700/50 |
| 2005/0049818 A1 * | 3/2005 | Liang | G06F 1/206 702/132 |
| 2005/0071705 A1 * | 3/2005 | Bruno | G06F 1/206 713/500 |
| 2005/0165577 A1 | 7/2005 | Fasullo et al. | |
| 2005/0166075 A1 * | 7/2005 | Hack | G06F 1/206 713/320 |
| 2005/0289372 A1 * | 12/2005 | Park | G06F 1/206 713/300 |
| 2006/0053316 A1 * | 3/2006 | Yamazaki | G06F 1/3203 713/300 |
| 2006/0072241 A1 * | 4/2006 | Feliss | G06F 1/184 360/97.22 |
| 2006/0091935 A1 * | 5/2006 | Tschanz | G06F 1/206 327/534 |
| 2006/0174146 A1 * | 8/2006 | Prosperi | G06F 1/206 713/320 |
| 2006/0265610 A1 * | 11/2006 | Kim | G06F 1/3203 713/300 |
| 2008/0001634 A1 * | 1/2008 | Arabi | G06F 1/206 326/99 |
| 2008/0028244 A1 * | 1/2008 | Capps | G06F 1/206 713/324 |
| 2008/0126826 A1 * | 5/2008 | Riedlinger | G06F 1/206 713/600 |
| 2008/0228959 A1 * | 9/2008 | Wang | G06F 1/206 710/22 |
| 2008/0270105 A1 * | 10/2008 | Poplack | G06F 1/206 703/23 |
| 2009/0222147 A1 * | 9/2009 | Nakashima | G06F 1/206 700/300 |
| 2009/0282174 A1 * | 11/2009 | Wu | G06F 11/328 710/19 |
| 2010/0030395 A1 * | 2/2010 | Shimotono | G06F 1/206 700/300 |
| 2010/0073068 A1 * | 3/2010 | Cho | G05D 23/1934 327/513 |
| 2010/0117579 A1 * | 5/2010 | Culbert | G06F 1/20 318/471 |
| 2010/0299517 A1 * | 11/2010 | Jukic | H04L 63/0823 713/150 |
| 2011/0055597 A1 | 3/2011 | Wyatt | |
| 2011/0283132 A1 | 11/2011 | Song et al. | |
| 2011/0320061 A1 * | 12/2011 | Chen | G05D 16/185 700/300 |
| 2012/0075992 A1 * | 3/2012 | Shahidi | H04B 1/036 370/235 |
| 2012/0110352 A1 * | 5/2012 | Branover | G06F 1/206 713/300 |
| 2012/0153279 A1 * | 6/2012 | Kim | G01R 31/2856 257/48 |

FOREIGN PATENT DOCUMENTS

| | | |
|---|---|---|
| CN | 201954670 | 8/2011 |
| JP | 2008-158787 | 7/2008 |
| JP | 2008-158787 A | 7/2008 |
| JP | 2009020748 | 1/2009 |
| JP | 2009-080780 | 4/2009 |
| JP | 200908070 | 6/2009 |
| KR | 10-2004-0105505 | 12/2004 |
| KR | 10-2004-0105505 A | 12/2004 |

OTHER PUBLICATIONS

International Search Report and Written Opinion received for PCT Application No. PCT/US2011/067949, mailed on Sep. 25, 2012, 11 Pages.
Korea Office Action from related case KR10-2014-7014234 mailed Apr. 27, 2016.
Japanese Office Action from related Japan Application 2014-547179 mailed Jun. 23, 2015 (English Translation).
European Search Report from related European Patent Application 11879051.8 mailed Jul. 9, 2015.
Korean Office Action from related case KR10-2014-7014234 mailed Dec. 16, 2015.
European Office Action from related case EP11879051.8 mailed Oct. 27, 2015.
Chinese Office Action issued in Chinese Application No. 201180076036.2, dated Dec. 2, 2016, with English translation.
Chinese Office Action issued in Chinese Application No. 201180076036.2, dated Aug. 24, 2016, with English translation, 26 pages.
European Office Action issued in European Application No. 11879051.8, dated Mar. 16, 2017, 3 pages.

* cited by examiner

ADAPTIVE THERMAL THROTTLING WITH USER CONFIGURATION CAPABILITY

FIELD

The present disclosure relates to adaptive thermal throttling, and more particularly, to adaptive thermal throttling with capability for user configuration.

BACKGROUND

As users move away from larger electronic devices towards devices with reduced form factors such as, for example, ultra-thin platforms for smartphones, tablets and laptops, thermal management issues become increasingly important. Smaller devices operating at higher performance levels generate and dissipate more heat. In some cases the use of cooling pads, by the user of the device, becomes necessary to provide insulation from the heat. Thermal thresholds and limitations for devices are typically set by the device manufacturers. There are generally no mechanisms available by which the user may configure the device with respect to heat dissipation in order to improve the user experience with the device as well as increase the battery life and longevity of the device platform.

BRIEF DESCRIPTION OF THE DRAWINGS

Features and advantages of embodiments of the claimed subject matter will become apparent as the following Detailed Description proceeds, and upon reference to the Drawings, wherein like numerals depict like parts, and in which:

Although the following Detailed Description will proceed with reference being made to illustrative embodiments, many alternatives, modifications, and variations thereof will be apparent to those skilled in the art.

DETAILED DESCRIPTION

Generally, this disclosure provides systems and methods for adaptive thermal throttling of electronic devices such as, for example, smartphones, tablets and laptops along with the capability for user configuration of thermal management. The user configuration may be provided locally or remotely as, for example, over the internet. Thermal management may be accomplished through the monitoring of thermal states associated with sub-systems of the device and the implementation of stored policies in response to the detection that the thermal states have exceeded specified thresholds. The policies and thresholds may be included in the user specified configuration. In some embodiments, user access to the thermal management system, particularly in the case of remote access, may be authenticated through a security mechanism and thermal management policies may be stored in a secured memory.

Figure 1:
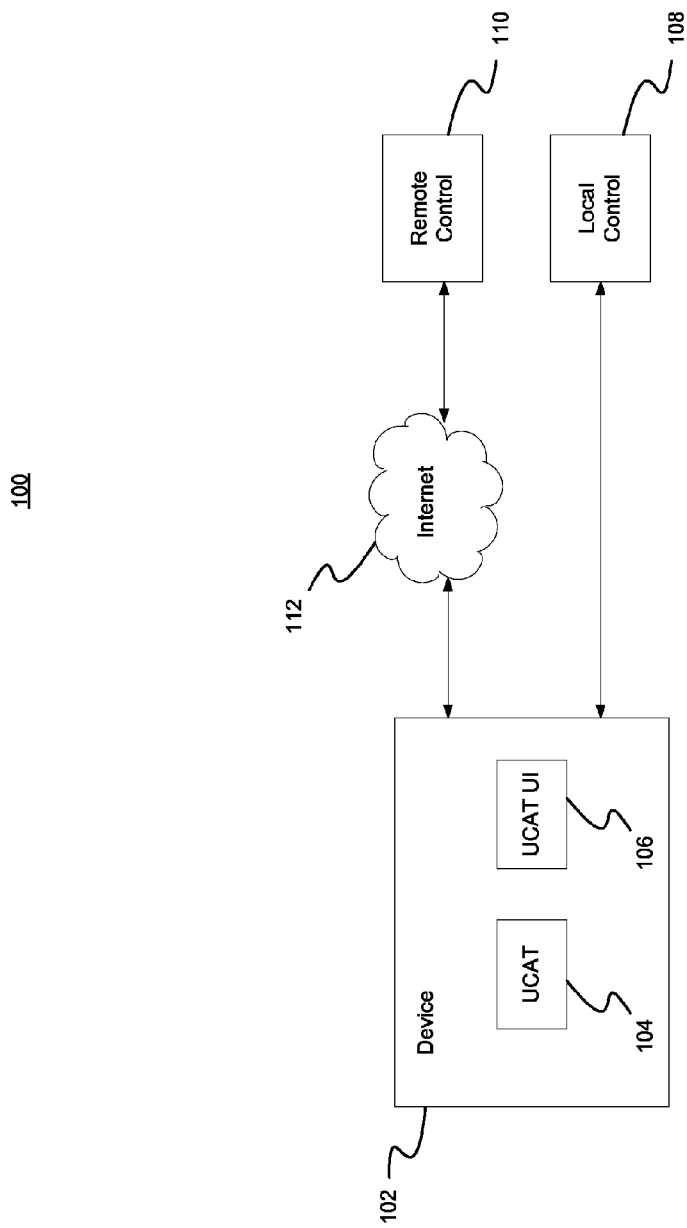
FIG. 1 illustrates a top level system diagram of one exemplary embodiment consistent with the present disclosure.

FIG. 1 illustrates a top level system diagram 100 of one exemplary embodiment consistent with the present disclosure. A device 102, which may be a laptop, a tablet, a smartphone or any other type of electronic device, comprises a user configurable adaptive thermal throttling (UCAT) module 104 and a UCAT user interface (UI) module 106. The UCAT UI module 106 provides a user of the device 102 with the capability to configure the thermal management of the device 102 by setting thermal thresholds and specifying thermal management policies and performance preferences. The UCAT module 104 monitors thermal states of various sub-systems and/or sensors associated with the device 102 and implements the appropriate thermal management policies when a sub-system's thermal state violates a threshold. In some embodiments the user may exert local control 108 directly through the UCAT UI module 106, while in other embodiments the user may exert remote control 110 through the internet 112 and then through the UCAT UI module 106. The remote control 110 may be, for example, a remote server or another laptop or smartphone. The internet connection may be a wired or wireless connection of any suitable type such as, for example, a WiFi or 3G connection or a cloud connection.

Figure 2:
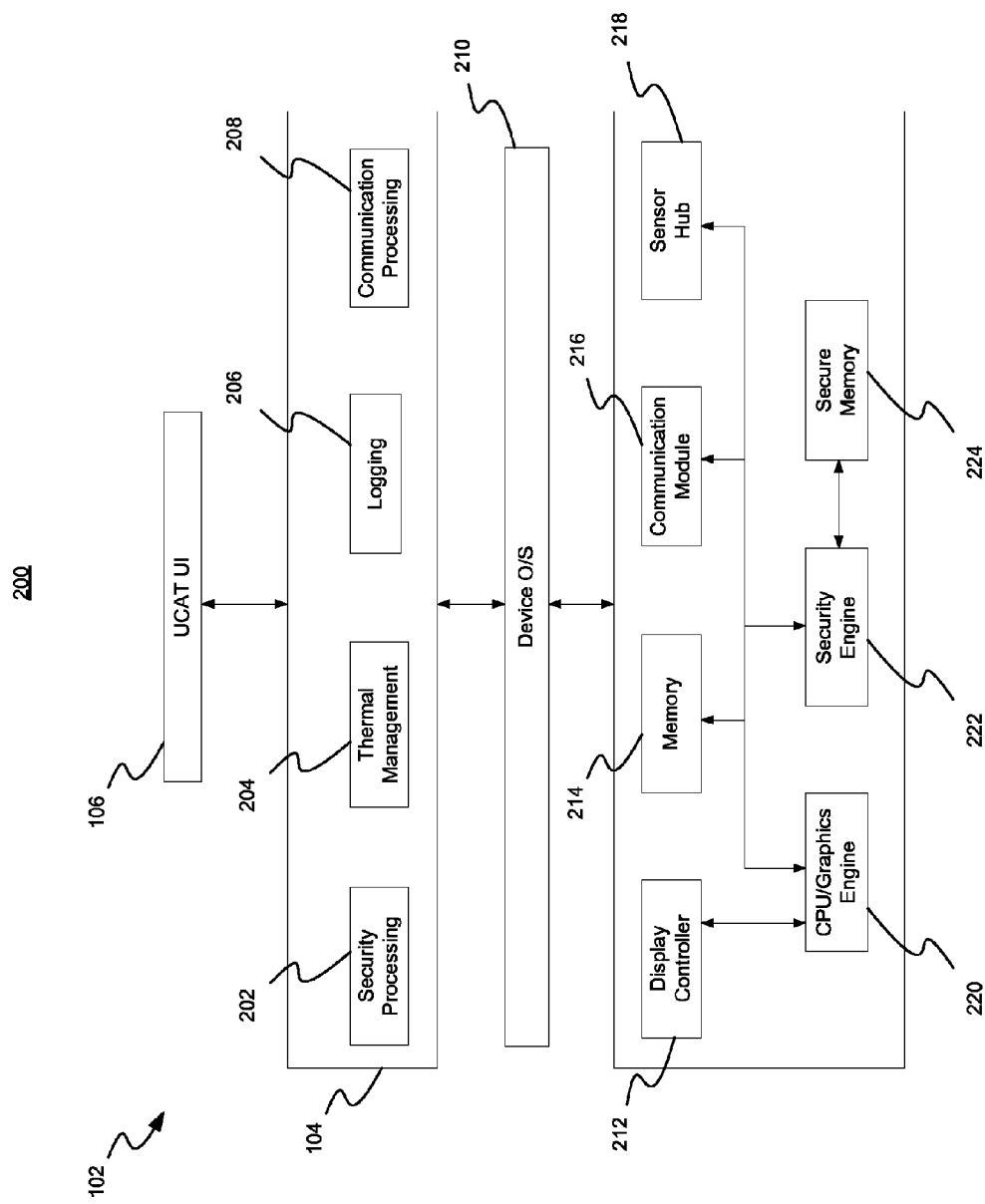
FIG. 2 illustrates a system block diagram of one exemplary embodiment consistent with the present disclosure.

FIG. 2 illustrates a system block diagram 200 of one exemplary embodiment consistent with the present disclosure. Shown within device 102 are UCAT module 104 and its sub-components, UCAT UI module 106, the device operating system (O/S) 210 and various device hardware components to be described below. UCAT module 104 may include security processing module 202, thermal management module 204, logging module 206 and communication processing module 208. Device hardware components may include display controller 212, CPU/graphics engine 220, memory 214, security engine 222, secure memory 224, communication module 216 and sensor hub 218.

Thermal management module 204 may provide the configuration, monitoring and policy enforcement capabilities which are described in greater detail below. Thermal management module 204 may also perform storage and retrieval of policies and thresholds from secure memory 224. Security processing module 202 may be used to authenticate users attempting to access the UCAT module 104, which may be particularly advantageous in the case of remote access. Security processing module 202 may work in conjunction with security engine 222 to perform the authentication. Logging module 206 may be used to log transactions associated with user configuration activity. Communication processing module 208 may be used to provide secure communication from the device 102 to a remote server such as a server associated with remote control 110.

Device O/S 210 may be a software module such as a computer operating system or mobile device operating system that provides general control and services for the device and/or components of the device. Device O/S 210 may execute on CPU/Graphics Engine 220 and provide interface services between UCAT modules 202, 204, 206, 208 and device hardware components 212, 214, 216, 218, 220, 222, 224. The device O/S 210 may also comprise existing platform power and performance managers which may impose performance constraints on device sub-systems and/or sensors to ensure that power and/or thermal limitation of the hardware are not exceeded.

The UCAT UI 106 may interface with a user through a display under the control of display controller 212 which provides display capabilities, particularly during local control.

Secure memory 224 may provide secure (tamper-proof) storage for thermal management policies. In some embodiments, secure memory 224 may be an embedded multimedia card (eMMC) NAND-based flash memory. Security engine 222 may be a hardware component that provides the required cryptographic operation for a tamper-proof execution environment.

Figure 3:
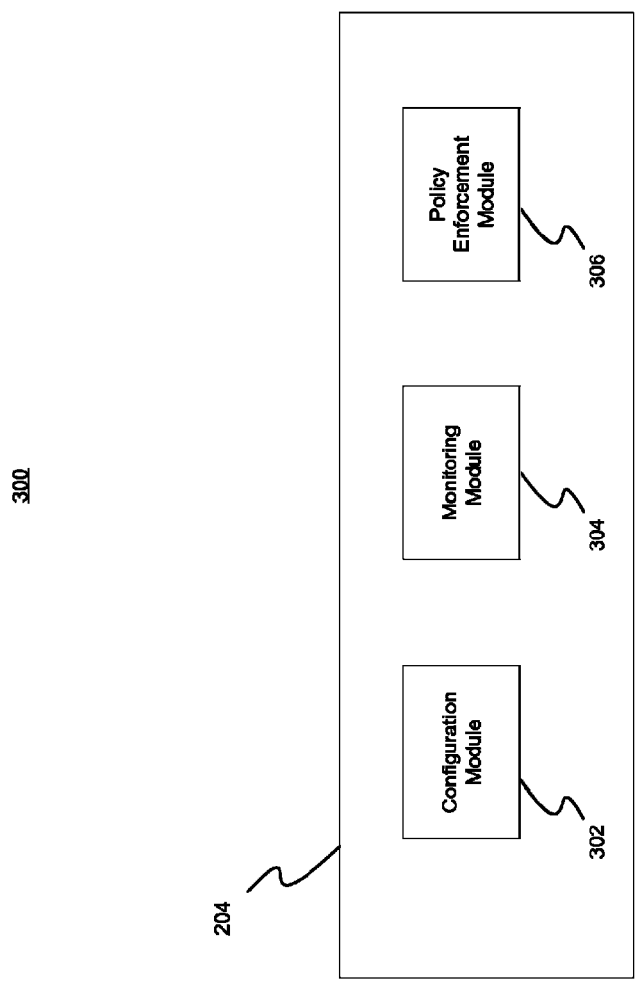
FIG. 3 illustrates a block diagram detail of one exemplary embodiment consistent with the present disclosure.

FIG. 3 illustrates a block diagram detail 300 of one exemplary embodiment consistent with the present disclosure. The thermal management module 204 comprises a configuration module 302, a monitoring module 304 and a policy enforcement module 306. Configuration module 302 may provide the capability to set thermal thresholds to be associated with sub-systems and/or sensors of the device 102. These thresholds may be based on user input such as, for example, user input provided by UCAT UI 106. Monitoring module 304 may be configured to monitor thermal states associated with the aforementioned sub-systems and/or sensors. Policy enforcement module 306 may implement a stored thermal management policy that has been associated with a violation of one of the thermal thresholds by one of the monitored thermal states. Thermal management policies may include taking actions such as decreasing (or otherwise adjusting) a clock frequency of a processor or other hardware component, or increasing (or otherwise adjusting) the speed of a cooling fan. The policies may be customized to depend on the current operational mode of the device 102 such as, for example, web browsing, GPS location servicing, or placing a phone call. The policies may also be customized to depend on the identity of a current user of the device 102 or to depend on the particular device 102. In some embodiments, the policies may be stored locally or remotely such as, for example, in a cloud server where they may be downloaded or accessed from one or more user devices.

The UCAT 104 may work with the platform power and performance managers of the Device O/S to ensure that thermal management configuration setting, based on stored policies or otherwise, do not violate platform power and performance constraints or other hardware limitations. In the event of potential violations, recommended modifications to the policy may be formulated and provided to the user. These recommendations may be based on user preferences.

Figure 4:
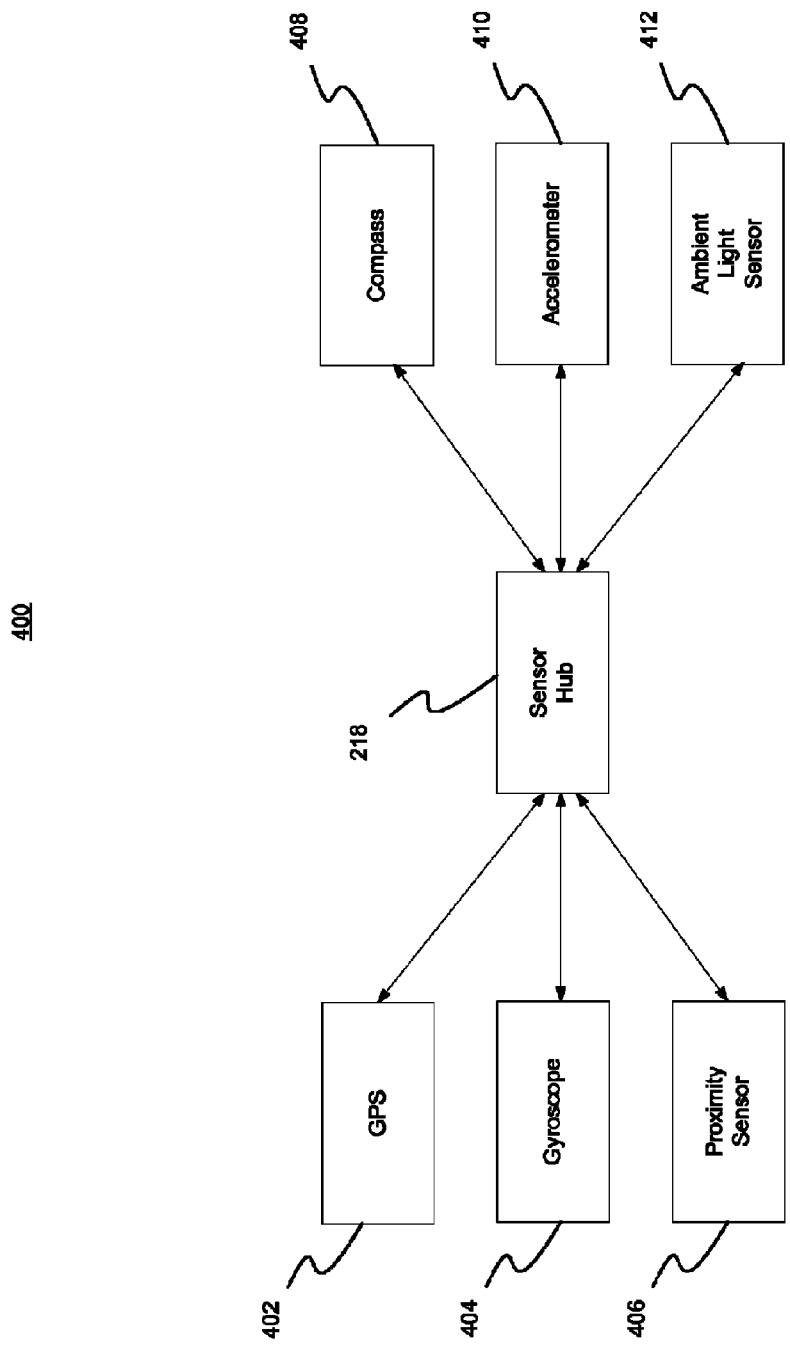
FIG. 4 illustrates another block diagram detail of one exemplary embodiment consistent with the present disclosure.

FIG. 4 illustrates another block diagram detail 400 of one exemplary embodiment consistent with the present disclosure. The sensor hub 218 interfaces with a variety of sensors that may be associated with or integrated in the device 102. These sensors may include a GPS 402, a gyroscope 404, a proximity sensor 406, a compass 408, an accelerometer 410 and an ambient light sensor 412. Additional sensors, not shown, may include thermal sensors, fan sensors, current sensors and/or any other sensors that may be suitable for use with device 102. In some embodiments, thermal threshold setting and monitoring may be accomplished through the sensor hub 218. In other embodiments, thermal threshold setting and monitoring may be performed directly on the sensors.

Figure 5:
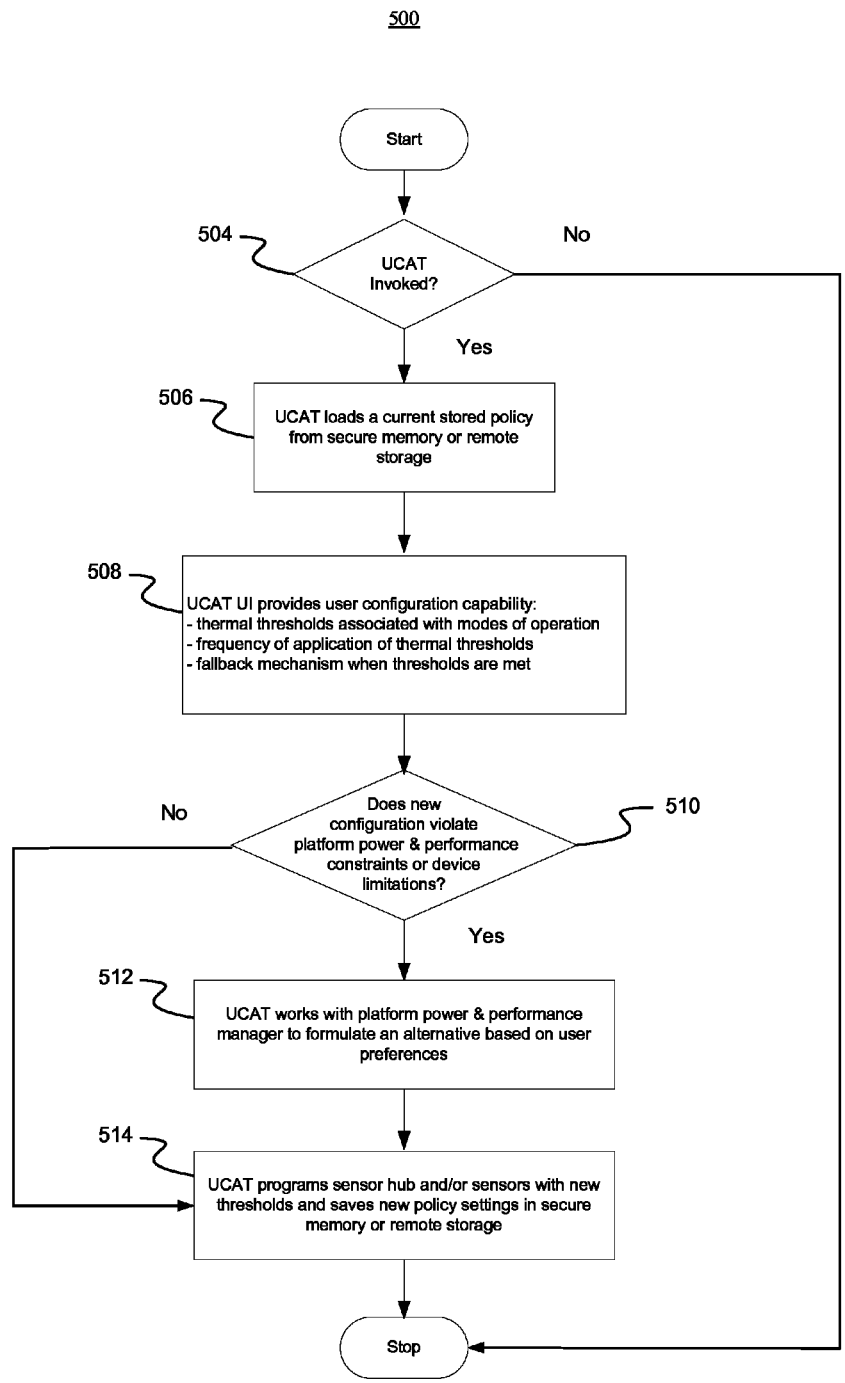
FIG. 5 illustrates a flowchart of operations of one exemplary embodiment consistent with the present disclosure.

FIG. 5 illustrates a flowchart of operations 500 of one exemplary embodiment consistent with the present disclosure. At operation 504, a determination is made as to whether the UCAT is invoked. If the UCAT has been invoked, then at operation 506, the UCAT loads a current stored policy from secure memory or remote storage. At operation 508, the UCAT user interface provides user configuration capability. This configuration capability may include the association of thermal thresholds with modes of operation, the setting of frequency of application of thermal thresholds (for example, the UCAT adaptation rate) and the specification of fallback mechanisms to be invoked when thermal thresholds are met or exceeded. At operation 510, a determination is made as to whether the new configuration violates platform power and performance constraints or device limitations. If such a violation exists, then at operation 512, the UCAT works with the platform power and performance manager, which may be part of the device O/S, to formulate an alternative configuration which may be based on user preferences. At operation 514, the UCAT programs the sensor hub and/or individual sensors with new thresholds and saves new policy settings in secure memory or remote storage. User preferences may also be saved in secure memory or remote storage.

In some embodiments, UCAT may provide the user with options to increase performance or provide an improved experience based on current device usage. For example, the UCAT UI may provide details to the user regarding the available operational frequency of the CPU and/or GPU and the corresponding thermal requirements and how this may affect the device skin temperature. The user may then chose a high performance or low performance mode of operation based on this information. In some cases, the user may prefer that the device operate in a maximum performance mode when the device is away from the user, such as, for example, when watching a movie with the device on a table or stand, where the device skin temperature is less important than performance.

Figure 6:
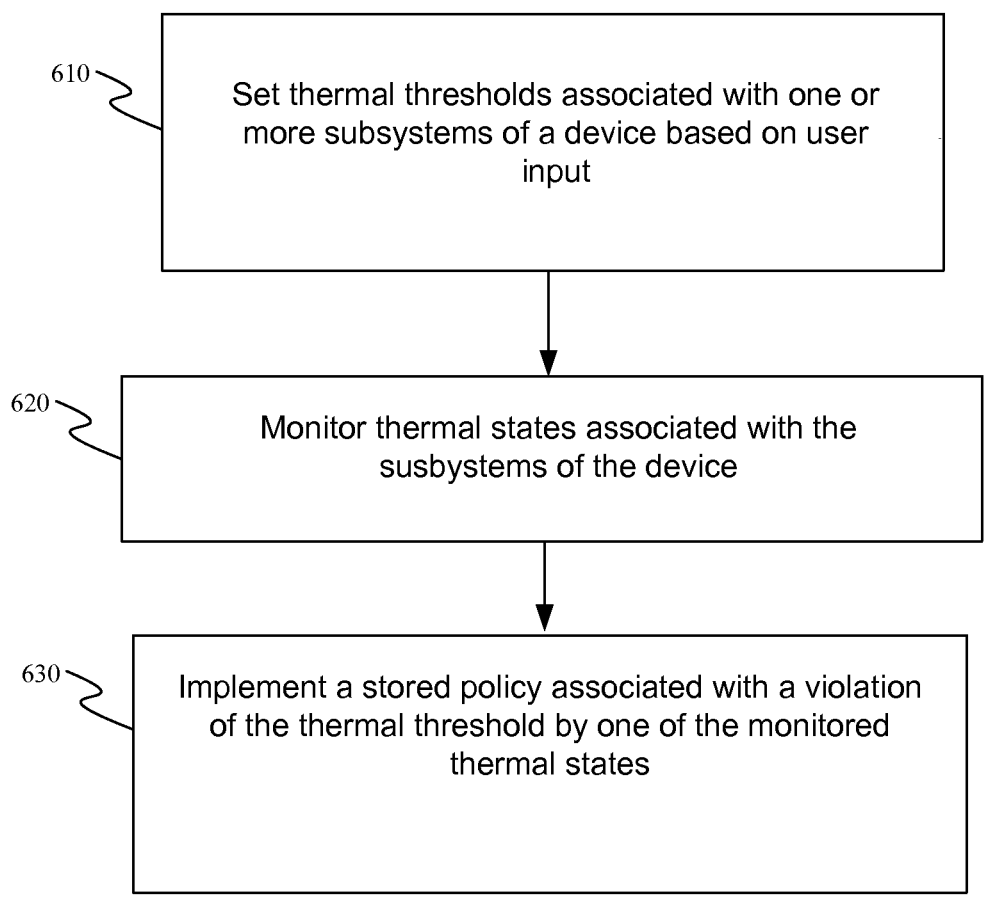
FIG. 6 illustrates a flowchart of operations of another exemplary embodiment consistent with the present disclosure.

FIG. 6 illustrates a flowchart of operations 600 of another exemplary embodiment consistent with the present disclosure. At operation 610, thermal thresholds associated with one or more sub-systems of a device are set based on user input. In some embodiments the user input may be obtained through the UCAT user interface either locally or remotely. At operation 620, thermal states associated with the sub-systems of the device are monitored. In some embodiments the sub-systems may include sensors such as GPS, gyroscope, proximity, accelerometer, compass, ambient light sensors or other suitable sensors. At operation 630, a stored policy associated with a violation of the thermal threshold by one of the monitored thermal states is implemented. In some embodiments the stored policies may also be obtained through the UCAT user interface either locally or remotely and the selection of a particular policy for implementation may depend on the current user and the current mode of operation of the device. In some embodiments, notification may be provided to the user when a violation of the thermal threshold by one of the monitored thermal states occurs. This notification may also be performed through the UCAT user interface.

Embodiments of the methods described herein may be implemented in a system that includes one or more storage mediums having stored thereon, individually or in combination, instructions that when executed by one or more processors perform the methods. Here, the processor may include, for example, a system CPU (e.g., core processor) and/or programmable circuitry. Thus, it is intended that operations according to the methods described herein may be distributed across a plurality of physical devices, such as processing structures at several different physical locations. Also, it is intended that the method operations may be performed individually or in a subcombination, as would be understood by one skilled in the art. Thus, not all of the operations of each of the flow charts need to be performed, and the present disclosure expressly intends that all subcombinations of such operations are enabled as would be understood by one of ordinary skill in the art.

The storage medium may include any type of tangible medium, for example, any type of disk including floppy disks, optical disks, compact disk read-only memories (CD-ROMs), compact disk rewritables (CD-RWs), digital versatile disks (DVDs) and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

"Circuitry", as used in any embodiment herein, may comprise, for example, singly or in any combination, hard-wired circuitry, programmable circuitry, state machine circuitry, and/or firmware that stores instructions executed by programmable circuitry.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus for thermal management of a device, comprising:
   a memory;
   a processor to load a thermal management policy, the thermal management policy including a plurality of thresholds encoded in the memory, the thresholds based on user input;
   thermal monitoring circuitry comprising a plurality of temperature sensors, each temperature sensor to monitor a thermal state of at least one subsystem of the device;
   a user interface to provide indications to a user, the indications including at least:
      a clock frequency of the processor; and
      effects of changing the clock frequency on a skin temperature of the device; and
   wherein the processor is further to decrease the clock frequency of the processor in response to a monitored thermal state exceeding one of the thresholds of the thermal management policy.

2. The apparatus of claim 1, wherein the user interface is further to receive the thresholds and to receive the thermal management policy.

3. The apparatus of claim 2, wherein the user interface is further to provide notification of the monitored thermal state violating the threshold.

4. The apparatus of claim 1, wherein the user interface further provides remote access to the apparatus.

5. The apparatus of claim 4, further comprising security circuitry to authenticate the user through the remote access.

6. The apparatus of claim 1, further comprising a cooling fan, wherein the thermal management policy comprises adjusting the speed of the cooling fan.

7. The apparatus of claim 1, wherein the subsystems of the device include one of a GPS, a gyroscope, a proximity sensor, a compass, an accelerometer, a thermal sensor, a fan sensor, a current sensor or an ambient light sensor.

8. The apparatus of claim 1, wherein the thermal management policy provides that hardware limitations of the device are not exceeded.

9. The apparatus of claim 1, wherein the device is one of a laptop, a tablet or a smartphone.

10. A thermal management system, comprising:
    a memory to store one or more stored policies;
    a processor to load a thermal management policy from the one or more stored policies, the thermal management policy including thermal thresholds associated with one or more temperature sensors of a device, the thermal thresholds based on user input;
    monitoring circuitry to monitor thermal states associated with the one or more temperature sensors of the device; and
    a user interface to provide indications to a user, the indications including at least:
       a clock frequency of the processor; and
       effects of changing the clock frequency on a skin temperature of the device;
    wherein the processor is further to implement the thermal management policy associated with a violation of one of the thermal thresholds by one of the monitored thermal states.

11. The thermal management system of claim 10, wherein the thermal management policy is associated with a mode of operation of the device.

12. The thermal management system of claim 11, wherein the mode of operation is one of a global positioning sensor (GPS) mode, a web browsing mode or a phone call mode.

13. The thermal management system of claim 10, wherein the thermal management policy comprises adjusting a clock frequency of the processor.

14. The thermal management system of claim 10, wherein the thermal management policy comprises adjusting a cooling fan speed.

15. The thermal management system of claim 10, wherein the monitoring circuitry is further to monitor thermal states associated with one or more subsystems of the device, wherein the subsystems include one of a GPS, a gyroscope, a proximity sensor, a compass, an accelerometer, a thermal sensor, a fan sensor, a current sensor or an ambient light sensor.

16. The thermal management system of claim 10, wherein the thermal management policy provides that hardware limitations of the device are not exceeded.

17. The thermal management system of claim 10, wherein the user interface is further to:
    receive the user input; and
    provide notification that the monitoring circuitry detects one of the thermal states violating one of the thermal thresholds.

18. The thermal management system of claim 17, wherein the user interface is further to provide remote access to the thermal management system.

19. The thermal management system of claim 18, further comprising security circuitry to authenticate the user through the remote access and to provide secure memory for the stored policies.

20. The thermal management system of claim 10, wherein one or more of the stored policies is associated with one or more other users.

21. The thermal management system of claim 10, wherein the device is one of a laptop, a tablet or a smartphone.

22. A method for thermal management of a device, comprising:
  loading, via a processor, a thermal management policy, the thermal management policy including one or more thresholds, the thresholds based on user input and associated with one or more temperature sensors of the device;
  monitoring, via thermal monitoring circuitry, thermal states associated with the one or more temperature sensors of the device, each temperature sensor to monitor a thermal state of at least one subsystem of the device;
  providing, via a user interface, indications to a user, the indications including at least:
    a clock frequency of the processor; and
    effects of changing the clock frequency on a skin temperature of the device; and
  decreasing, via the processor, a clock frequency of the processor in response to a monitored thermal state exceeding one of the thresholds of the thermal management policy.

23. The method of claim 22, further comprising associating the thermal management policy with a mode of operation of the device.

24. The method of claim 23, wherein the mode of operation is one of a global positioning sensor (GPS) mode, a web browsing mode or a phone call mode.

25. The method of claim 22, further comprising adjusting a cooling fan speed according to the at least one thermal management policy.

26. The method of claim 22, wherein the subsystems of the device include one of a GPS, a gyroscope, a proximity sensor, a compass, an accelerometer, a thermal sensor, a fan sensor, a current sensor or an ambient light sensor.

27. The method of claim 22, wherein the at least one thermal management policy provides that hardware limitations of the device are not exceeded.

28. The method of claim 22, further comprising providing, via the user interface, notification to the user of the violation of one of the thresholds by one of the monitored thermal states.

29. The method of claim 22, further comprising providing remote access to the device and authenticating the user through the remote access.

30. The method of claim 22, further comprising providing secure storage for the thermal management policy.

31. The method of claim 22, further comprising storing, via a memory, one or more thermal management policies, wherein one or more of the stored thermal management policies is associated with one or more other users.

32. A non-transitory computer-readable storage medium having instructions stored thereon which when executed by a processor result in the following operations comprising:
  load a thermal management policy, the a thermal management policy including one or more thresholds, the one or more thresholds based on user input and associated with one or more temperature sensors of a device;
  monitor thermal states associated with one or more subsystems of the device;
  provide indications to a user, the indications including at least:
    a clock frequency of the processor; and
    effects of changing the clock frequency on a skin temperature of the device; and
  decrease the clock frequency of the processor in response to a monitored thermal state exceeding one of the thresholds of the thermal management policy.

33. The non-transitory computer-readable storage medium of claim 32, wherein the operations further comprise associate the thermal management policy with a mode of operation of the device.

34. The non-transitory computer-readable storage medium of claim 32, wherein the operations further comprise adjust a cooling fan speed according to the thermal management policy.

35. The non-transitory computer-readable storage medium of claim 32, wherein the operations further comprise provide notification to the user of the violation of one of the thermal thresholds by one of the monitored thermal states.

* * * * *